United States Patent
Kim et al.

(10) Patent No.: US 10,292,155 B2
(45) Date of Patent: May 14, 2019

(54) METHOD AND DEVICE FOR RECEIVING MULTICAST FRAME IN WIRELESS LAN

(71) Applicant: LG ELECTRONICS INC., Seoul (KR)

(72) Inventors: Jeongki Kim, Seoul (KR); Kiseon Ryu, Seoul (KR); Giwon Park, Seoul (KR); Hangyu Cho, Seoul (KR); Suhwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 221 days.

(21) Appl. No.: 15/021,654

(22) PCT Filed: Sep. 15, 2014

(86) PCT No.: PCT/KR2014/008565
§ 371 (c)(1),
(2) Date: Mar. 11, 2016

(87) PCT Pub. No.: WO2015/037958
PCT Pub. Date: Mar. 19, 2015

(65) Prior Publication Data
US 2016/0227534 A1 Aug. 4, 2016

Related U.S. Application Data

(60) Provisional application No. 61/877,296, filed on Sep. 13, 2013.

(51) Int. Cl.
*H04W 72/04* (2009.01)
*H04W 72/00* (2009.01)
(Continued)

(52) U.S. Cl.
CPC ..... *H04W 72/0446* (2013.01); *H04W 72/005* (2013.01); *H04W 74/006* (2013.01); *H04W 84/12* (2013.01)

(58) Field of Classification Search
CPC . H04W 52/367; H04W 60/04; H04W 72/044; H04W 72/0453; H04W 72/08;
(Continued)

(56) References Cited

U.S. PATENT DOCUMENTS

| 2005/0220131 A1 | 10/2005 | Ginzburg et al. |
| 2006/0140186 A1* | 6/2006 | LoGalbo ............... H04L 1/1671 370/390 |

(Continued)

FOREIGN PATENT DOCUMENTS

| WO | 2013/009012 A2 | 1/2013 |
| WO | 2013/095355 A1 | 6/2013 |

OTHER PUBLICATIONS

PCT International Application No. PCT/KR2014/008565, International Search Report dated Dec. 17, 2014, 1 page.

*Primary Examiner* — Romani Ohri
(74) *Attorney, Agent, or Firm* — Lee Hong Degerman Kang & Waimey

(57) ABSTRACT

A method and a device for receiving a multicast frame in a wireless LAN are disclosed. The method for receiving a multicast frame in a wireless LAN comprises the steps of: combining, by an STA, an AP on the basis of an initial access frame transmitted by the AP through a primary channel; setting, by the STA, an operating channel as an exclusive multicast channel on a first time resource, wherein the first time resource and the primary channel are indicated on the basis of the initial access frame; receiving, by the STA, the multicast frame from the AP through the exclusive multicast channel on the first time resource; setting, by the STA, the operating channel as the primary channel on a second time resource; and receiving, by the STA, a unicast frame from the AP through the primary channel on the second time resource.

4 Claims, 10 Drawing Sheets

(51) Int. Cl.
*H04W 74/00* (2009.01)
*H04W 84/12* (2009.01)

(58) Field of Classification Search
CPC ............. H04L 25/0204; H04L 27/2601; H04L 5/0007; H04L 5/0032; H04L 5/005
See application file for complete search history.

(56) References Cited

U.S. PATENT DOCUMENTS

| | | | |
|---|---|---|---|
| 2007/0076650 A1* | 4/2007 | Manjeshwar | H04W 24/02 370/328 |
| 2007/0201413 A1 | 8/2007 | Laine et al. | |
| 2007/0286121 A1 | 12/2007 | Kolakowski et al. | |
| 2009/0323608 A1* | 12/2009 | Adachi | H04W 48/18 370/329 |
| 2014/0281623 A1* | 9/2014 | Zhang | G06F 1/3234 713/323 |
| 2016/0081079 A1* | 3/2016 | Kneckt | H04W 76/002 370/329 |
| 2016/0119762 A1* | 4/2016 | Zhu | H04W 76/28 370/312 |

\* cited by examiner

METHOD AND DEVICE FOR RECEIVING MULTICAST FRAME IN WIRELESS LAN

CROSS-REFERENCE TO RELATED APPLICATIONS

This application is the National Stage filing under 35 U.S.C. 371 of International Application No. PCT/KR2014/008565, filed on Sep. 15, 2014, which claims the benefit of U.S. Provisional Application No. 61/877,296, filed on Sep. 13, 2013, the contents of which are all hereby incorporated by reference herein in their entirety.

BACKGROUND OF THE INVENTION

Field of the Invention

The present invention relates to wireless communication, and more particularly, to a method and apparatus for receiving a multicast frame in a wireless local area network (WLAN).

Related Art

A Wireless Next Generation Standing Committee (WNG SC) of institute of electrical and electronic engineers (IEEE) 802.11 is an AD-HOC committee that a next-generation wireless local area network (WLAN) in the medium and long term.

In an IEEE conference in March 2013, Broadcom presented the need of discussion of the next-generation WLAN after IEEE 802.11ac in the first half of 2013 when an IEEE 802.11ac standard is finished based on a WLAN standardization history. A motion for foundation of a study group which Orange and Broadcom proposed in the IEEE conference in March 2013 and most members agreed has been passed.

A scope of IEEE 802.11ax (or a high efficiency WLAN (HEW)) which the next-generation WLAN study group primarily discusses the next-generation study group called the HEW includes 1) improving a 802.11 physical (PHY) layer and a medium access control (MAC) layer in bands of 2.4 GHz and 5 GHz, 2) increasing spectrum efficiency and area throughput, 3) improving performance in actual indoor and outdoor environments such as an environment in which an interference source exists, a dense heterogeneous network environment, and an environment in which a high user load exists, and the like. That is, the IEEE 802.11ax operates at 2.4 GHz and 5 GHz similarly to the existing WLAN system. A primarily considered scenario is a dense environment in which access points (APs) and stations (STAs) are a lot and under such a situation, improvement of the spectrum efficiency and the area throughput is discussed. In particular, in addition to the indoor environment, in the outdoor environment which is not considerably considered in the existing WLAN, substantial performance improvement is concerned.

In the IEEE 802.11ax, scenarios such as wireless office, smart home, stadium, Hotspot, and building/apartment are largely concerned and discussion about improvement of system performance in the dense environment in which the APs and the STAs are a lot is performed based on the corresponding scenarios.

In the future, in the IEEE 802.11ax, improvement of system performance in an overlapping basic service set (OBSS) environment and improvement of outdoor environment performance, and cellular offloading are anticipated to be actively discussed rather than improvement of single link performance in one basic service set (BSS). Directionality of the HEV means that the next-generation WLAN gradually has a technical scope similar to mobile communication. When a situation is considered, in which the mobile communication and the WLAN technology haven been discussed in a small cell and a direct-to-direct (D2D) communication area in recent years, technical and business convergence of the next-generation WLAN and the mobile communication based on the HEW is predicted to be further active.

SUMMARY OF THE INVENTION

The present invention provides a method for receiving a multicast frame in a wireless local area network (WLAN).

The present invention also provides an apparatus for receiving a multicast frame in a WLAN.

According to one aspect of the present invention, there is provided a method for receiving a multicast frame in a WLAN. The method may include: associating, by a station (STA), with an access point (AP) on the basis of an initial access frame transmitted by the AP through a primary channel; configuring, by the STA, an operating channel as a dedicated multicast channel on a first time resource; receiving, by the STA, the multicast frame from the AP through the dedicated multicast channel on the first time resource; configuring, by the STA, the operating channel as the primary channel on a second time resource; and receiving, by the STA, a unicast frame from the AP through the primary channel on the second time resource. The dedicated multicast channel may be a channel for only a multicast of the AP. The primary channel may be a channel for transmission other than the multicast of the AP. The first time resource and the second time source may do not overlap with each other.

According to another aspect of the present invention, there is provided an STA for receiving a multicast frame in a WLAN. The STA may include: a radio frequency (RF) unit implemented to transmit or receive a radio signal; and a processor operatively coupled to the RF unit. The processor may be implemented to: associate with an AP on the basis of an initial access frame transmitted by the AP through a primary channel; configure an operating channel as a dedicated multicast channel on a first time resource; receive the multicast frame from the AP through the dedicated multicast channel on the first time resource; configure the operating channel as the primary channel on a second time resource; and receive a unicast frame from the AP through the primary channel on the second time resource. The dedicated multicast channel may be a channel for only a multicast of the AP. The primary channel may be a channel for transmission other than the multicast of the AP. The first time resource and the second time source may do not overlap with each other.

By configuring a channel for an additional multicast, an AP which intends to transmit a multicast frame can avoid a contention with an STA which intends to transmit a unicast frame. Therefore, a quality of service (QoS) of the multicast can be improved.

DESCRIPTION OF EXEMPLARY EMBODIMENTS

Figure 1:
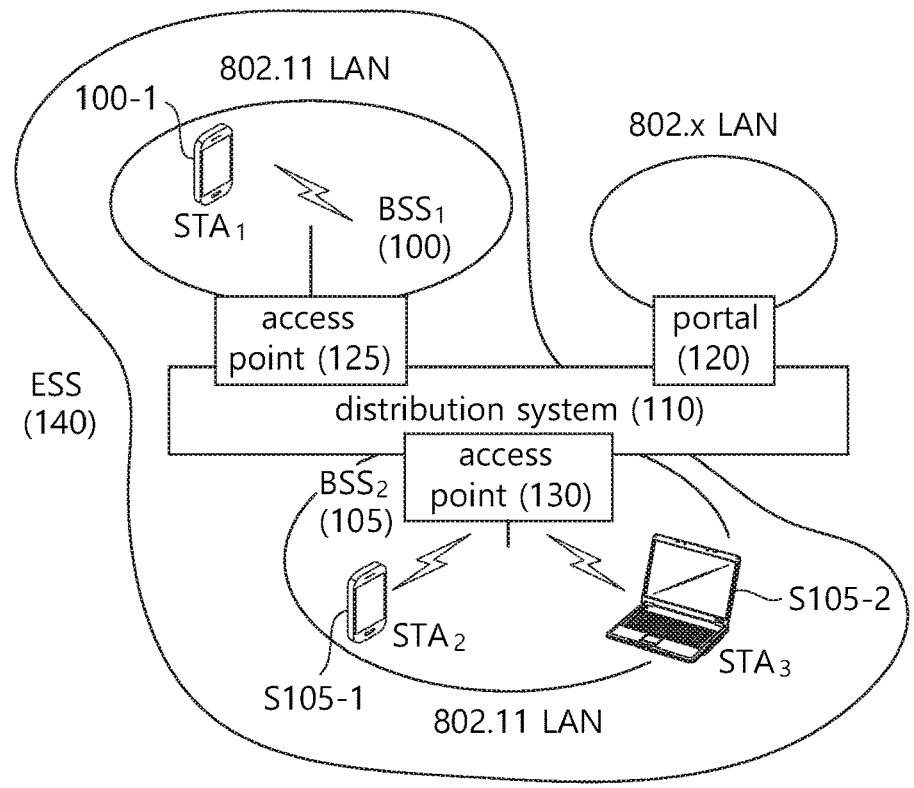
FIG. 1 is a concept view illustrating the structure of a wireless local area network (WLAN).
Figure 1:
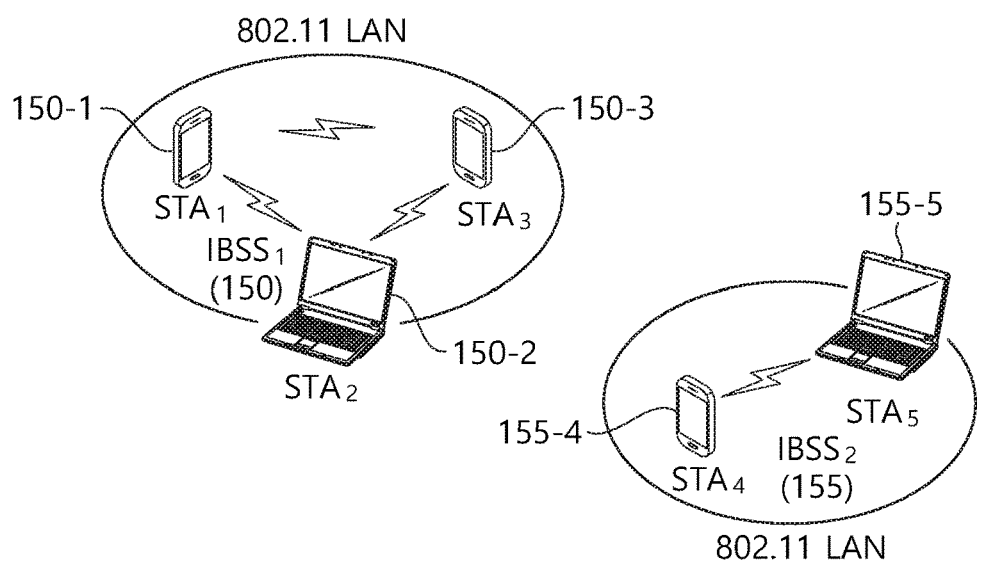

FIG. 1 is a concept view illustrating the structure of a wireless local area network (WLAN).

An upper part of FIG. 1 shows the structure of the IEEE (institute of electrical and electronic engineers) 802.11 infrastructure network.

Referring to the upper part of FIG. 1, the WLAN system may include one or more basic service sets (BSSs, 100 and 105). The BSS 100 or 105 is a set of an AP such as AP (access point) 125 and an STA such as STA1 (station) 100-1 that may successfully sync with each other to communicate with each other and is not the concept to indicate a particular area. The BSS 105 may include one AP 130 and one or more STAs 105-1 and 105-2 connectable to the AP 130.

The infrastructure BSS may include at least one STA, APs 125 and 130 providing a distribution service, and a distribution system (DS) 110 connecting multiple APs.

The distribution system 110 may implement an extended service set (ESS) 140 by connecting a number of BSSs 100 and 105. The ESS 140 may be used as a term to denote one network configured of one or more APs 125 and 130 connected via the distribution system 110. The APs included in one ESS 140 may have the same SSID (service set identification).

The portal 120 may function as a bridge that performs connection of the WLAN network (IEEE 802.11) with other network (for example, 802.X).

In the infrastructure network as shown in the upper part of FIG. 1, a network between the APs 125 and 130 and a network between the APs 125 and 130 and the STAs 100-1, 105-1, and 105-2 may be implemented. However, without the APs 125 and 130, a network may be established between the STAs to perform communication. The network that is established between the STAs without the APs 125 and 130 to perform communication is defined as an ad-hoc network or an independent BSS (basic service set).

A lower part of FIG. 1 is a concept view illustrating an independent BSS.

Referring to the lower part of FIG. 1, the independent BSS (IBSS) is a BSS operating in ad-hoc mode. The IBSS does not include an AP, so that it lacks a centralized management entity. In other words, in the IBSS, the STAs 150-1, 150-2, 150-3, 155-4 and 155-5 are managed in a distributed manner. In the IBSS, all of the STAs 150-1, 150-2, 150-3, 155-4 and 155-5 may be mobile STAs, and access to the distribution system is not allowed so that the IBSS forms a self-contained network.

The STA is some functional medium that includes a medium access control (MAC) following the IEEE (Institute of Electrical and Electronics Engineers) 802.11 standards and that includes a physical layer interface for radio media, and the term "STA" may, in its definition, include both an AP and a non-AP STA (station).

The STA may be referred to by various terms such as mobile terminal, wireless device, wireless transmit/receive unit (WTRU), user equipment (UE), mobile station (MS), mobile subscriber unit, or simply referred to as a user.

Figure 2:
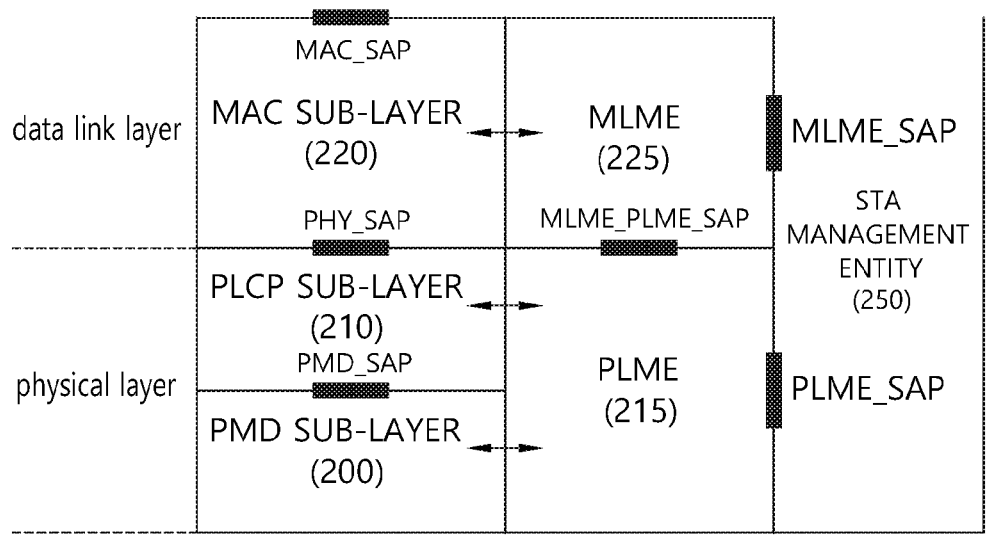
FIG. 2 is a view illustrating a layer architecture of a WLAN system supported by IEEE 802.11.

FIG. 2 is a view illustrating a layer architecture of a WLAN system supported by IEEE 802.11.

FIG. 2 conceptually illustrates a layer architecture (PHY architecture) of a WLAN system.

The WLAN system layer architecture may include an MAC (medium access control) sub-layer 220, a PLCP (Physical Layer Convergence Procedure) sub-layer 210, and a PMD (Physical Medium Dependent) sub-layer 200. The PLCP sub-layer 210 is implemented so that the MAC sub-layer 220 is operated with the minimum dependency upon the PMD sub-layer 200. The PMD sub-layer 200 may serve as a transmission interface to communicate data between a plurality of STAs.

The MAC sub-layer 220, the PLCP sub-layer 210, and the PMD sub-layer 200 may conceptually include management entities.

The management entity of the MAC sub-layer 220 is denoted an MLME (MAC layer management entity, 225), and the management entity of the physical layer is denoted a PLME (PHY layer management entity, 215). Such management entities may offer an interface where a layer management operation is conducted. The PLME 215 is connected with the MLME 225 to be able to perform a management operation on the PLCP sub-layer 210 and the PMD sub-layer 200, and the MLME 225 is also connected with the PLME 215 to be able to perform a management operation on the MAC sub-layer 220.

There may be an SME (STA management entity, 250) to perform a proper MAC layer operation. The SME 250 may be operated as a layer independent component. The MLME, PLME, and SME may communicate information between the mutual components based on primitive.

The operation of each sub-layer is briefly described below. The PLCP sub-layer 210 delivers an MPDU (MAC protocol data unit) received from the MAC sub-layer 220 according to an instruction from the MAC layer between the MAC sub-layer 220 and the PMD sub-layer 200 to the PMD sub-layer 200 or delivers a frame from the PMD sub-layer 200 to the MAC sub-layer 220. The PMD sub-layer 200 is a PLCP sub-layer and the PMD sub-layer 200 may communicate data between a plurality of STAs by way of a radio medium. The MPDU (MAC protocol data unit) delivered from the MAC sub-layer 220 is denoted a PSDU (Physical Service Data Unit) on the side of the PLCP sub-layer 210. The MPDU is similar to the PSDU, but in case an A-MPDU (aggregated MPDU), which is obtained by aggregating a plurality of MPDUs, has been delivered, each MPDUs may differ from the PSDU.

The PLCP sub-layer 210 adds an additional field including information required by the physical layer transceiver while receiving the PSDU from the MAC sub-layer 220 and delivering the same to the PMD sub-layer 200. In this case, the added field may include a PLCP preamble to the PSDU, a PLCP header, and tail bits necessary to return the convolution encoder to zero state. The PLCP preamble may play a role to allow the receiver to prepare for syncing and antenna diversity before the PSDU is transmitted. The data field may include padding bits to the PSDU, a service field including a bit sequence to initialize the scrambler, and a coded sequence in which a bit sequence added with tail bits has been encoded. In this case, as the encoding scheme, one of BCC (Binary Convolutional Coding) encoding or LDPC (Low Density Parity Check) encoding may be selected depending on the encoding scheme supported by the STA receiving the PPDU. The PLCP header may include a field containing information on the PPDU (PLCP Protocol Data Unit) to be transmitted.

The PLCP sub-layer 210 adds the above-described fields to the PSDU to generate the PPDU (PLCP Protocol Data Unit) and transmits the same to a receiving station via the PMD sub-layer 200, and the receiving station receives the PPDU and obtains information necessary for data restoration from the PLCP preamble and PLCP header to thus restore the same.

Groupcast with retries (GCR) is a multicast transmission method for improving reliability for a multicast service of a WLAN.

In multicast transmission prior to the IEEE 802.11aa standard, after sequentially transmitting a multicast frame to a plurality of STAs, an AP does not receive an acknowledgement (ACK) frame from an STA which receives the multicast frame. Since the AP does not additionally receive the ACK frame for the multicast frame, a transfer rate may not be high in comparison with other methods. However, reliability for a service may not be ensured. Therefore, an increase in the number of users results in an increase in a frame error rate (FER), which causes a quality degradation.

In the IEEE 802.11 aa standard, in order to improve reliability for a multicast service, a group cast protocol defined as a group address transmission service (GATS) has been developed. In the IEEE 802.11aa standard, a GCR-Unsolicited Retry scheme and a GCR with block ACK (BA) scheme have been additionally defined by including a directed multicast service (DMS) scheme defined in IEEE 802.1v.

In the DMS scheme, a transmitting STA may perform unicast transmission repetitively by the number of receiving STAs for receiving a frame. In the DMS scheme, the transmitting STA may receive an ACK frame for each transmission frame from each receiving STA. Therefore, the DMS scheme has a disadvantage in that a transmission time is long, while having an advantage in that reliability is high.

In the GCR-Unsolicited Retry scheme, the same frame is transmitted repetitively by a predetermined number simultaneously to a plurality of receiving STAs, and an ACK frame for the repetitively transmitted frame may not be transmitted from the receiving STA to the transmitting STA. In case of using the GCR-Unsolicited Retry scheme, there is an increase in reliability depending on the number of times of repeating frame transmission, but a transmission time may be increased by that much.

Finally, in the GCR-BA scheme, frames consecutive by a predetermined size are transmitted from the transmitting STA to the receiving STA, and a block ACK frame may be transmitted by each receiving STA to the transmitting STA in a one-to-one manner. In case of using the GCR-BA scheme, a transmission time of multicast transmission may be decreased, and reliability may be ensured. However, a reliability degradation problem may occur when a transmission opportunity (TXOP) duration ends in a transmission duration in which an ACK frame is transmitted by a plurality of receivers. Accordingly, a precise configuration is necessary for the TXOP duration.

Hereinafter, a frame to be unicast, a frame to be multicast, and a frame to be broadcast may be respectively expressed by a term "unicast frame", "multicast frame", and "broadcast frame" in an embodiment of the present invention. In addition, transmission from an AP to an STA may be expressed by a term "downlink transmission", and a frame transmitted in a downlink may be expressed by a term "downlink frame". On the contrary, transmission from the STA to the AP may be expressed by a term "uplink transmission", and a frame transmitted in an uplink may be expressed by a term "uplink frame".

Figure 3:
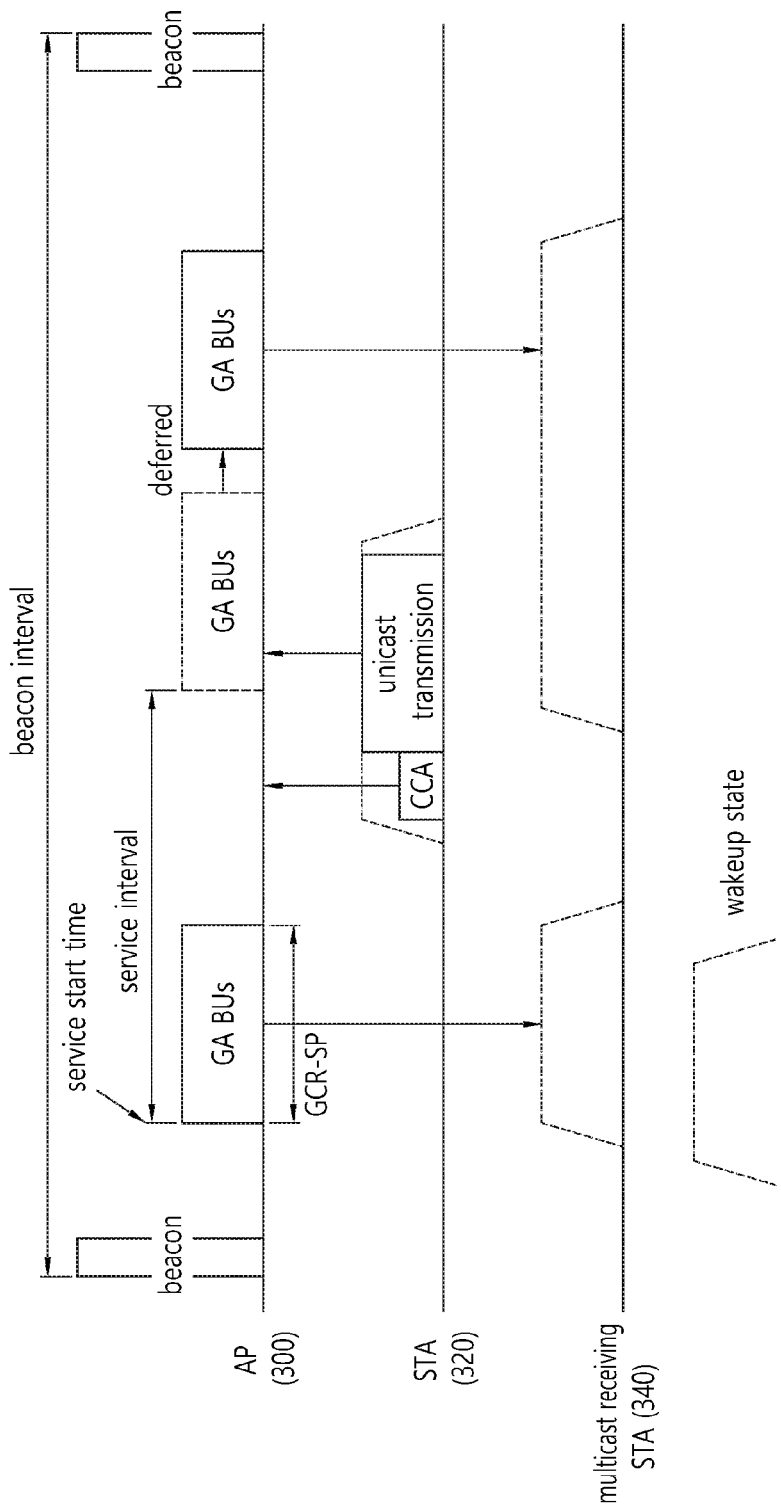
FIG. 3 is a concept view illustrating multicast frame transmission of an access point (AP) on a groupcast with retries (GCR)-service period (SP).

FIG. 3 is a concept view illustrating multicast frame transmission of an AP on a GCR-service period (SP).

Referring to FIG. 3, the GCR-SP may be a service period (or a time resource) for performing a GCR-based multicast. A scheduled GCR-SP is a period shorter than a beacon interval, and group addressed bufferable units (GA BUs) may be multicast on the scheduled GCR-SP.

Before an AP 300 multicasts the GA BUs on the scheduled GCR-SP, a specific STA 320 may unicast a frame. In this case, a transmission duration of a unicast frame of the specific STA 320 may overlap with the scheduled GCR-SP. In this case, even if the scheduled GCR-SP is used, the AP 300 may defer transmission of the GA BUs until a transmission ending time of the unicast frame of the STA 320. That is, the AP 300 may defer the scheduled GCR-SP until after the end of transmission of the unicast frame of the STA 320, and may multicast the GA BUs on the deferred GCR-SP.

More specifically, the power saving STA 320 may perform a clear channel assessment (CCA) when having data to be transmitted to the AP 300. If a channel is idle, the STA 320 may transmit a unicast frame to the AP 300. If a time resource for the transmission of the unicast frame of the specific STA 320 overlaps with the scheduled GCR-SP for the multicast of the GA BUs, the AP 300 cannot multicast the GA BUs on the scheduled GCR-SP. The multicast of the GA BUs may be deferred until after the transmission of the unicast frame of the specific STA 320, and may be performed on the deferred GCR-SP.

Eventually, the multicast of the GA BUs of the AP 300 is delayed, and the delay of the multicast of the GA BUs may result in a quality of service (QoS) degradation of the multicast.

Further, the delay of the multicast of the GA BUs of the AP 300 leads to a delay of a reception time of the GA BUs of the STA 340 for receiving a multicast frame (hereinafter, the multicast receiving STA 340). Therefore, the multicast receiving STA 340 may unnecessarily consume power.

Figure 4:
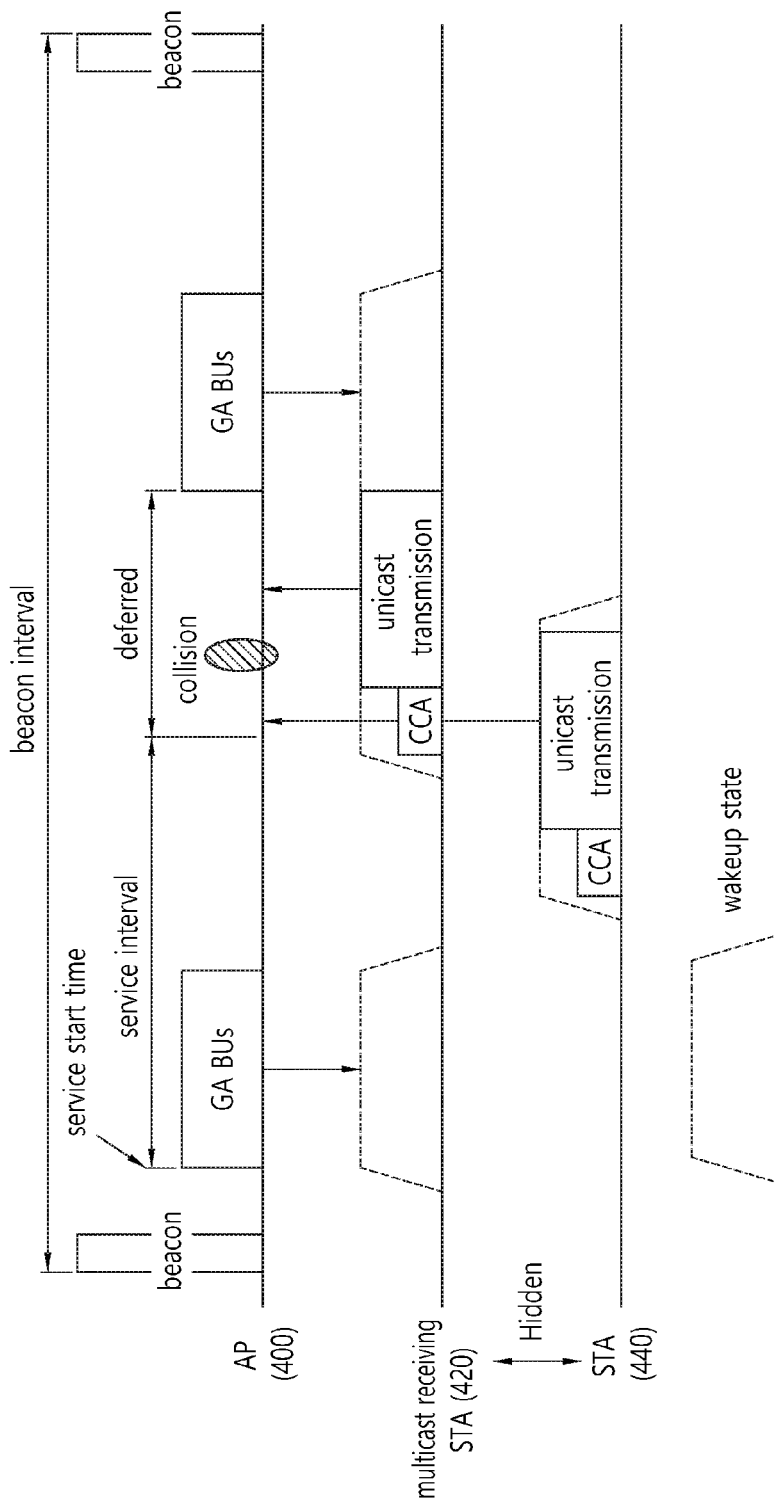
FIG. 4 is a concept view illustrating multicast frame transmission of an AP on a GCR-SP.

FIG. 4 is a concept view illustrating multicast frame transmission of an AP on a GCR-SP.

Referring to FIG. 4, GA BUs may not be transmitted by an AP 400 on a scheduled GCR-SP. In this case, a multicast receiving STA 420 may not know whether a multicast frame to be transmitted by the AP 400 is not present on the scheduled GCR-SP or the multicast frame is not transmitted since the scheduled GCR-SP is deferred.

For example, the multicast receiving STA 420 may wait for multicast frame transmission performed by the AP 400 on the scheduled GCR-SP, and if the multicast frame is not transmitted from the AP 400 on the scheduled GCR-SP, may attempt unicast frame transmission to the AP 400 by performing a CCA.

If the scheduled GCR-SP is deferred due to unicast frame transmission of a hidden STA 440, a collision occurs between a frame which is unicast by the hidden STA 400 and a frame which is unicast by a multicast STA, and a system performance may deteriorate.

Further, in downlink transmission for transmitting data from the AP to the STA, the scheduled GCR-SP may overlap with a time resource for downlink transmission to an STA scheduled on the basis of a TIM of a beacon frame. In this case, the AP may defer the scheduled GCP-AP until all buffered frames are transmitted through a time resource for TIM-based downlink transmission. The deferring of the scheduled GCR-SP may lead to a QoS degradation of the multicast.

In the multicast of the legacy WLAN, a multicast frame and a unicast frame are transmitted on the same channel in a contention-based manner. That is, an AP which intends to transmit the multicast frame cannot avoid a contention with an STA which intends to transmit the unicast frame. The contention may have an effect on a QoS of the multicast.

Hereinafter, in an embodiment of the present invention, a multicast method using a dedicated multicast channel is described to solve the multicast problem of the legacy WLAN.

Figure 5:
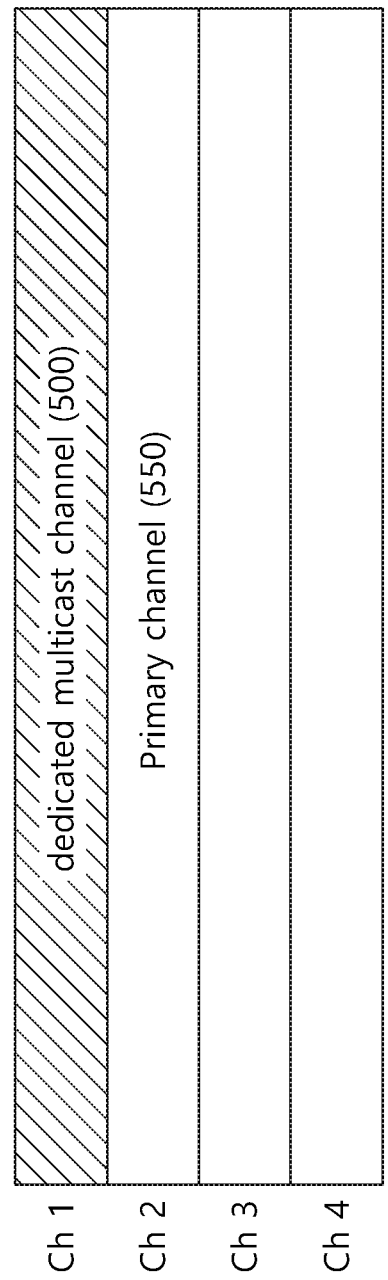
FIG. 5 is a concept view illustrating a dedicated multicast channel according to an embodiment of the present invention.

FIG. 5 is a concept view illustrating a dedicated multicast channel according to an embodiment of the present invention.

Referring to FIG. 5, a dedicated multicast channel 500 may be used for multicast frame transmission performed by an AP. An STA and the AP operate on multi-channels. Each of a primary channel and a dedicated multicast channel may be at least one channel among the multi-channels.

Only the multicast frame transmission performed by the AP may be allowed on the dedicated multicast channel 500. A multicast receiving STA may receive only a multicast frame from the AP through the dedicated multicast channel 500. That is, not only frame transmission (uplink transmission) from the STA to the AP but also a channel access of the STA to the AP is not allowed on the dedicated multicast channel 500. Only the multicast frame transmission of the AP and multicast frame reception of the multicast receiving STA may be allowed on the dedicated multicast channel 500.

A unicast frame transmitted by the AP may be transmitted to the STA through a normal channel including a primary channel 550 other than the dedicated multicast channel 500. Further, the STA may transmit (broadcast/multicast/unicast) an uplink frame to the AP through the normal channel other than the dedicated multicast channel 500.

For example, as shown in FIG. 5, if four channels (i.e., Ch1, Ch2, Ch3, and Ch4) are available, among the four channels, the Ch1 may be used as the dedicated multicast channel, and the Ch2 may be used as the primary channel 550.

In order to prevent the channel access of the STA to the dedicated multicast channel 500, a beacon frame transmitted by the AP may include information for indicating the dedicated multicast channel 500. The information included in the beacon frame to indicate the dedicated multicast channel 500 may be expressed by a term "dedicated multicast channel indicator". For example, if the dedicated multicast channel indicator is 0, this may indicate that the dedicated multicast channel 500 is not additionally used, and if the dedicated multicast indicator is 1, this may indicate that the dedicated multicast channel 500 is used.

According to another embodiment of the present invention, the channel access of the STA to the dedicated multicast channel 500 may be restricted on the basis of a BSS load element. For example, in the BSS load element of the beacon frame transmitted through the dedicated multicast channel 500, all bits of a station (STA) count field may be set to 1, and a channel utilization field may be set to 255. An STA count is the number of STAs having access to a BSS at present, and the channel utilization field may include information indicating whether a channel is busy. If all bits of the STA count field are set to 1 and the channel utilization field is set to 255 in the BSS load element of the beacon frame received by the STA through the dedicated multicast channel 500, the STA may determine a state of the dedicated multicast channel 500 as a busy state, and may not access the dedicated multicast channel 500.

Alternatively, the AP may not transmit a response frame for an initial access for an STA which intends to perform an initial access procedure (e.g., a scanning procedure, an authentication procedure, an association procedure) through the dedicated multicast channel 500. For example, if the STA transmits a probe request frame to the AP through the dedicated multicast channel 500, the AP may not transmit a probe response frame to the STA in response to the probe request frame.

The beacon frame transmitted by the AP through the dedicated multicast channel 500 may further include information on the primary channel 550 (e.g., information on the primary channel, channel bandwidth information of the primary channel, information on a full bandwidth) for associating the STA and the AP through the primary channel.

If the STA receives the beacon frame through the dedicated multicast channel 500, an operating channel may be changed to the primary channel 550 to associate with the AP on the basis of the information on the primary channel 550. The STA which has moved to the primary channel 550 may perform a scanning procedure, an authentication procedure (authentication frame transmission, authentication response reception), and/or an association procedure (association request frame transmission, association response frame transmission) through the primary channel 550. The scanning procedure may be performed on the basis of a probe request frame transmitted by the STA through the primary channel 550, or may be performed on the basis of a beacon frame transmitted by the AP through the primary channel 550.

The beacon frame transmitted by the AP through the primary channel 550 may include information on the dedicated multicast channel 500. The information on the dedicated multicast channel 500 may include information on a channel index of the dedicated multicast channel 500, a bandwidth of the dedicated multicast channel 500, or the like.

The information on the dedicated multicast channel 500 may be included not only in the beacon frame but also in the authentication response frame and/or the association response frame or the like transmitted in the authentication procedure and/or the association procedure. Alternatively, the information on the dedicated multicast channel 500 may be transmitted through a generic advertisement service (GAS) frame (e.g., a GAS initial response frame, a GAS comeback response frame) transmitted by the AP in a service discovery process.

According to an embodiment of the present invention, the STA may be associated with the AP through the primary channel 550 on the basis of the information on the dedicated multicast channel 500 and/or the primary channel 550. After being associated with the AP, the STA may receive a unicast frame from the AP and transmit an uplink frame through the primary channel 550. Further, the AP may receive a multicast frame through the dedicated multicast channel 500.

Figure 6:
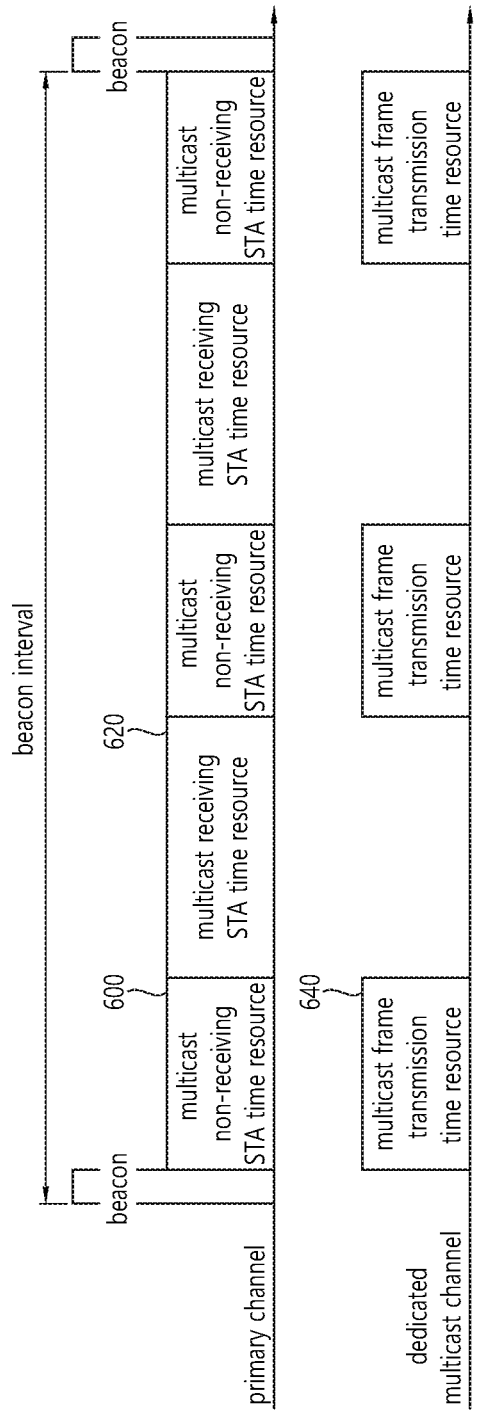
FIG. 6 is a concept view illustrating multicast frame transmission through a dedicated multicast channel of an AP according to an embodiment of the present invention.

FIG. 6 is a concept view illustrating multicast frame transmission through a dedicated multicast channel of an AP according to an embodiment of the present invention.

Transmission of each of a unicast frame and a multicast frame of the AP through each of a primary channel and a dedicated multicast channel is disclosed in FIG. 6.

If an STA has a single radio frequency (RF) unit, the STA cannot receive a downlink frame transmitted by the AP simultaneously through the primary channel and the dedicated multicast channel. If the STA has the single RF unit, the STA may receive the downlink frame through one of the primary channel and the dedicated multicast channel.

According to the embodiment of the present invention, the STA may receive a unicast frame through a unicast channel or may receive a multicast frame through the multicast channel. Hereinafter, an STA which receives the multicast frame may be expressed by a term "multicast receiving STA", and an STA which does not receive the multicast frame may be expressed by a term "multicast non-receiving STA".

The multicast receiving STA and the multicast non-receiving STA may be associated with the AP on the basis of an initial access through the primary channel.

First, the AP may perform the following operation on the basis of the dedicated multicast channel. The AP may transmit a multicast frame to the multicast receiving STA through the dedicated multicast channel on a time resource determined among all time resources. The time resource on which the multicast frame is transmitted through the dedicated multicast channel may be expressed by a term "multicast frame transmission time resource" 640.

Next, the AP may perform the following operation on the basis of the primary channel. The AP may transmit a unicast frame and/or a broadcast frame to the multicast receiving STA and the multicast non-receiving STA through the primary channel. A case where the AP transmits the unicast frame to the multicast receiving STA and the multicast non-receiving STA through the primary channel is assumed in the following descriptions for convenience of explanation.

The AP may transmit the unicast frame on the primary channel by distinguishing a time resource 620 for transmitting the unicast frame to the multicast receiving STA and a time resource 600 for transmitting the unicast frame to the multicast non-receiving STA.

For example, the time resource for transmitting the unicast frame on the primary channel may be divided into the multicast receiving STA time resource 620 for transmitting the unicast frame to the multicast receiving STA and the multicast non-receiving STA time resource 600 for transmitting the unicast frame to the multicast non-receiving STA. For example, it may be configured such that the multicast non-receiving STA time resource 600 overlaps with the multicast frame transmission time resource 640 and the multicast receiving STA's time resource 620 does not overlap with the multicast frame transmission time resource 640.

The AP may transmit the unicast frame to the multicast non-receiving STA through the primary channel on the multicast non-receiving STA time resource 600. Further, the unicast frame may be transmitted to the multicast receiving STA through the primary channel on the multicast receiving STA time resource 620. Furthermore, as described above, the AP may transmit the multicast frame to the multicast receiving STA through the dedicated multicast channel on the multicast frame transmission time resource 640 overlapping with the multicast non-receiving STA time resource 600.

According to another embodiment of the present invention, the multicast non-receiving STA may use the multicast receiving STA time resource 620. Whether to use the multicast receiving STA time resource 620 of the multicast non-receiving STA may be determined on the basis of an amount of data, the number of STAs for receiving the multicast frame, or the like transmitted through the dedicated multicast channel on the multicast frame transmission time resource 640.

For example, if the amount of data or the number of STAs for receiving the multicast frame exceeds a threshold, the number of multicast receiving STAs for transmitting an uplink frame by accessing the AP on the multicast receiving STA time resource 6t20 may be increased. Therefore, if the amount of data or the number of STAs for receiving the multicast frame is greater than or equal to the threshold, only a channel access of the multicast receiving STA may be allowed to decrease congestion for the channel access on the multicast receiving STA time resource 620.

The multicast receiving STA operating in the primary channel may receive the multicast frame from the AP on the multicast frame transmission time resource 640 by transitioning (or switching) from the primary channel to the dedicated multicast channel. After switching to the dedicated multicast channel, the multicast receiving STA may receive a multicast frame transmitted from the AP. If the scheduled multicast frame transmission time resource 640 expires, the multicast receiving STA may switch the operating channel from the dedicated multicast channel to the primary channel. The STA may receive a unicast frame transmitted from the AP on the multicast receiving STA time resource 620 through the switched primary channel. Further, the multicast receiving STA may transmit an uplink frame to the AP through the primary channel on the multicast receiving STA time resource 620.

The multicast non-receiving STA may receive a unicast frame from the AP through the primary channel on the multicast non-receiving STA time resource 600. Further, the multicast non-receiving STA may transmit an uplink frame to the AP through the primary channel on the multicast non-receiving STA time resource 600. As described above, if it is allowed to use the multicast receiving STA time resource 620 of the multicast non-receiving STA, the multicast non-receiving STA may transmit an uplink frame to the AP and receive a unicast frame through not only the multicast non-receiving STA time resource 600 but also the multicast receiving STA time resource 620.

At least one of information on the multicast frame transmission time resource 640, information on the multicast receiving STA time resource 620, and information on the multicast non-receiving STA time resource 600 may be transmitted through a beacon frame. For example, if the beacon frame includes the information on the multicast frame transmission time resource 640, the multicast receiving STA time resource 620 and the multicast non-receiving STA time resource 600 may be determined. More particularly, a time resource corresponding to the multicast frame transmission time resource 640 may be the multicast receiving STA time resource 600, and a time resource excluding the time resource corresponding to the multicast frame transmission time resource 640 may be the multicast non-receiving STA time resource 620.

Further, information on whether to use the multicast receiving STA time resource 620 of the multicast non-receiving STA may also be transmitted through the beacon frame.

For example, a resource sharing indication field of the beacon frame may include a resource sharing indicator. The resource sharing indicator may include information on whether to use the multicast receiving STA time resource 620 of the multicast non-receiving STA. If the resource sharing indicator is 0, it is allowed to use the multicast receiving STA time resource 620 of the multicast non-receiving STA. On the contrary, if the resource sharing indicator is 1, it may be restricted to use the multicast receiving STA time resource 620 of the multicast non-receiving STA.

Further, according to another embodiment of the present invention, a multicast frame may be transmitted through the dedicated multicast channel on the basis of a multicast receiving STA group. The plurality of multicast receiving STAs may be grouped into a plurality of multicast receiving STA groups. The multicast frame transmission time resource 640 may be allocated for each of the multicast receiving STA groups.

For example, it may be assumed that the plurality of multicast receiving STAs are grouped into a multicast receiving STA group 1 and a multicast receiving STA group 2.

An AP may transmit a multicast frame to the multicast receiving STA group 1 through the dedicated multicast channel on a multicast frame transmission time resource 1. A multicast receiving STA included in the multicast receiving STA group 1 may receive a unicast frame from the AP through the primary channel on a time resource excluding the multicast frame transmission time resource 1.

Further, the AP may transmit the multicast frame to the multicast receiving STA group 2 through the dedicated multicast channel on a multicast frame transmission time resource 2. A multicast receiving STA included in the multicast receiving STA group 2 may receive a unicast frame from the AP through the primary channel on a time resource excluding the multicast frame transmission time resource 2.

The multicast frame transmission time resource 1 and the multicast frame transmission time resource 2 may be resources corresponding to respective non-consecutive multicast frame transmission time resources or may be resources divided in consecutive multicast frame transmission time resources.

That is, the multicast receiving STA may operate in the dedicated multicast channel only in a multicast frame transmission time resource for the multicast receiving STA among all multicast frame transmission time resources.

If the multicast frame is not transmitted to the multicast receiving STA, the multicast receiving STA may transition to a sleep mode. A case where the multicast frame is not transmitted to the multicast receiving STA may include a case where the multicast frame is transmitted by the AP to another multicast receiving STA group not including the multicast receiving STA and a case where the multicast frame is completely transmitted by the AP to the multicast receiving STA group including the multicast receiving STA. That is, the multicast receiving STA may operate in a sleep mode on a time resource on which the multicast frame is not transmitted to the multicast receiving STA.

The beacon frame may include information for multicast frame transmission based on the multicast receiving STA group as described above. For example, the beacon frame may be transmitted by including at least one of information indicating whether multicast frame transmission through the dedicated multicast channel will be performed on the basis of the multicast receiving STA group, information on the multicast receiving STA group, and information on a multicast frame transmission time resource allocated to the multicast receiving STA group.

The AP may transmit the multicast frame to the multicast receiving STA through the dedicated multicast channel on the basis of an enhanced distributed channel access (EDCA). That is, after performing a CCA, the AP may transmit the multicast frame only when the channel is idle.

Figure 7:
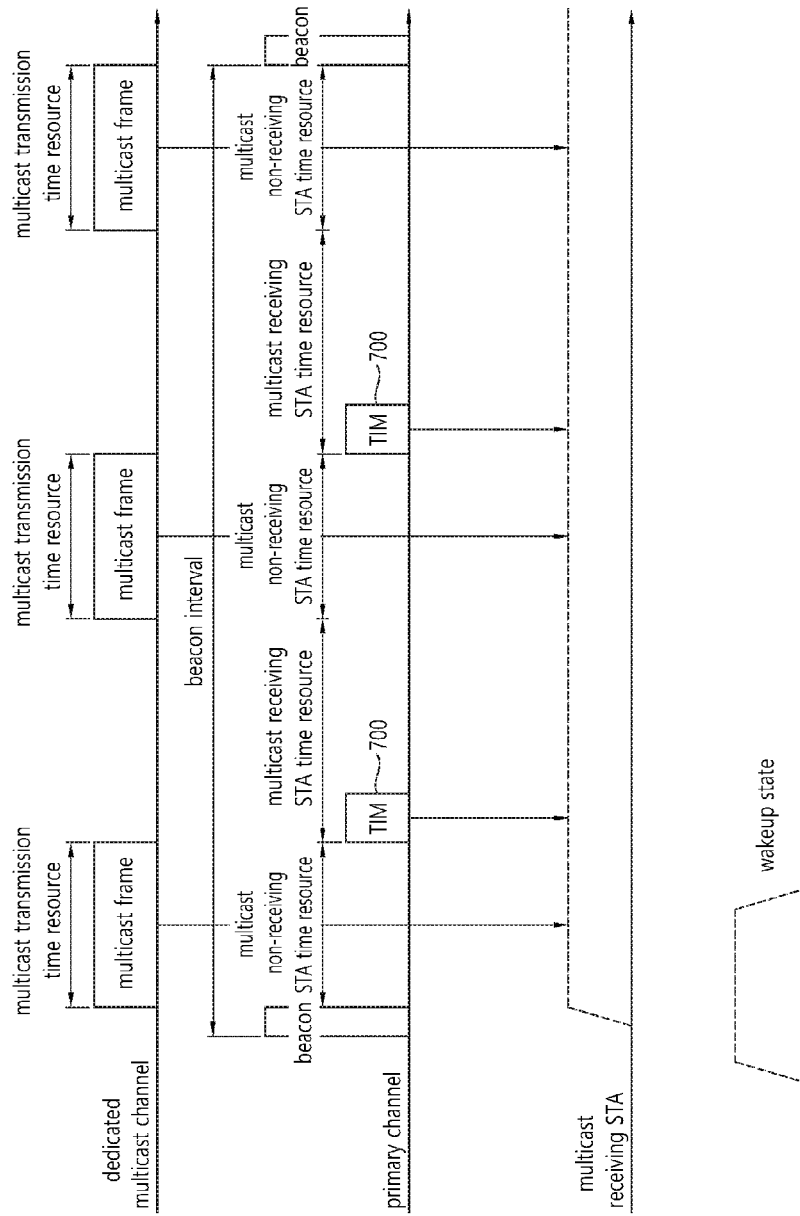
FIG. 7 is a concept view illustrating multicast frame transmission through a dedicated multicast channel according to an embodiment of the present invention.

FIG. 7 is a concept view illustrating multicast frame transmission through a dedicated multicast channel according to an embodiment of the present invention.

In FIG. 7, a multicast receiving STA may operate in a power saving mode during a multicast receiving STA time resource period. Therefore, an AP may transmit a TIM 700 to the multicast receiving STA to operate a specific multicast receiving STA in an active mode during the multicast receiving STA time resource period. The TIM 700 may indicate the specific multicast receiving STA for receiving a unicast frame.

That is, the TIM 700 may indicate the multicast receiving STA for receiving the unicast frame among a plurality of multicast receiving STAs. The multicast receiving STA indicated on the basis of the TIM 700 among the plurality of multicast receiving STAs may maintain the active mode during the multicast receiving STA time resource period and may receive a unicast frame transmitted by the AP. In this case, the multicast receiving STA indicated on the basis of the TIM 700 may transmit to the AP a frame (e.g., a PS poll frame) for reporting the reception of the TIM 700 to the AP. For example, the multicast receiving STA indicated on the basis of the TIM 700 may transmit the PS poll frame to the AP through a primary channel on the multicast receiving STA time resource, and the AP may transmit the unicast frame to the STA which has transmitted the PS poll frame.

In this case, it there is no uplink frame to be transmitted to the AP, a multicast receiving STA not indicated based on the TIM 700 may transition to a doze state or may remain in the current state during the multicast reception time resource period.

Figure 8:
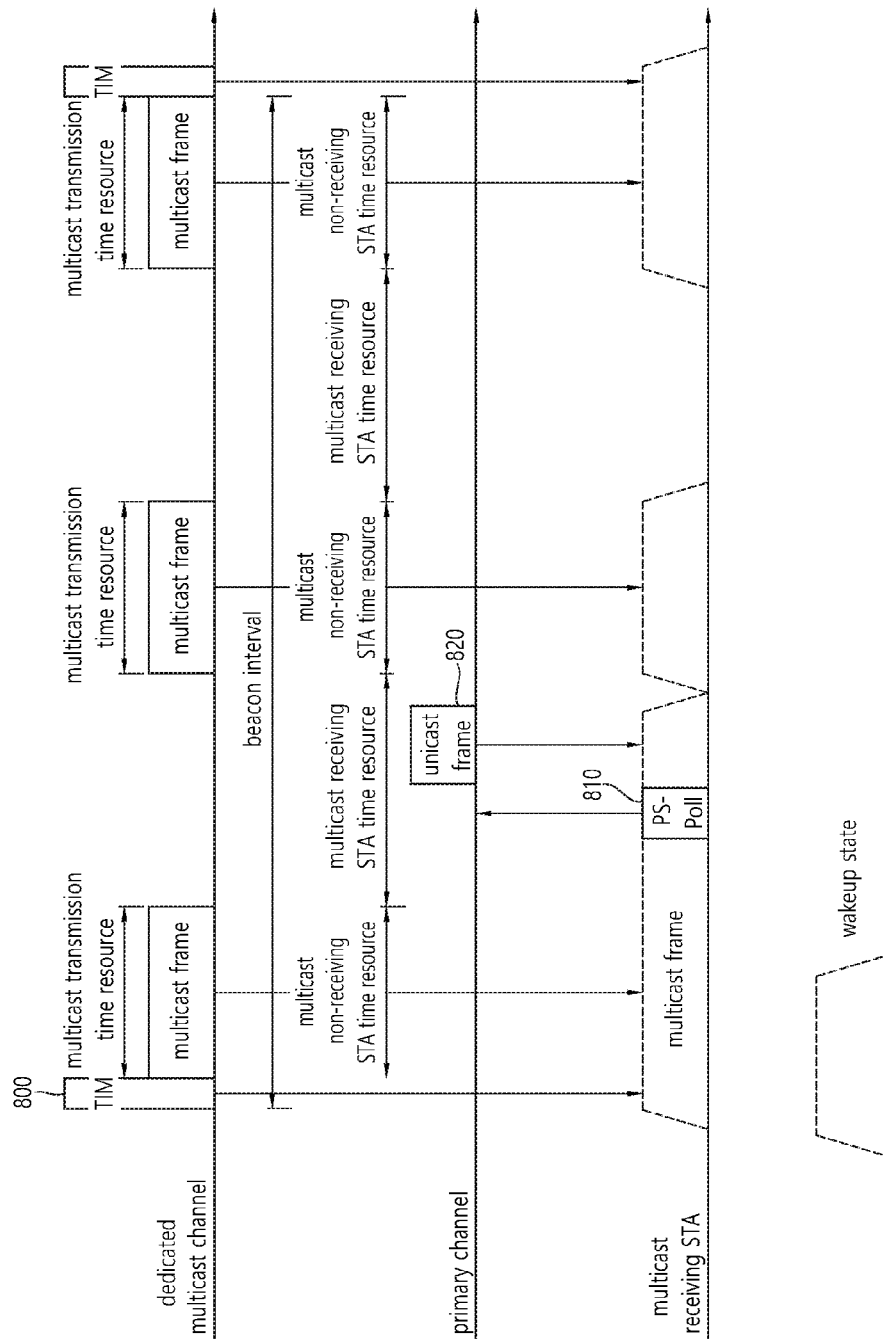
FIG. 8 is a concept view illustrating multicast frame transmission through a dedicated multicast channel of an AP according to an embodiment of the present invention.

FIG. 8 is a concept view illustrating multicast frame transmission through a dedicated multicast channel of an AP according to an embodiment of the present invention.

In a method of FIG. 8, a multicast receiving STA receives a TIM 800 through a dedicated multicast channel, and the multicast receiving STA indicated by the TIM 800 switches an operating channel from the dedicated multicast channel to a primary channel.

The multicast receiving STA may be associated with the AP through the primary channel, and thereafter may receive a multicast frame from the AP by switching the operating channel to the dedicated multicast channel on a multicast transmission time resource.

If the multicast receiving STA has an uplink frame to be transmitted to the AP (or if uplink data is pended), the multicast receiving STA may switch the operating channel from the dedicated multicast channel to the primary channel, and may transmit the uplink frame on the multicast receiving STA time resource.

Further, if the AP has a downlink frame to be unicast to the multicast receiving STA (or if downlink data is pended), the AP may transmit the TIM 800 to the multicast receiving STA through the dedicated multicast channel on the multicast frame transmission time resource. The multicast receiving STA may confirm that the AP has data buffered (or pended) for the multicast receiving STA on the basis of the TIM 800. The multicast receiving STA indicated by the TIM 800 may switch the operating channel to the primary channel to receive a unicast frame from the AP during the multicast receiving STA time resource period or to transmit the uplink frame to the AP.

More specifically, the multicast receiving STA indicated by the TIM 800 may report to the AP the reception of the TIM 800 from the AP, and may transmit to the AP a frame (i.e., PS-poll frame) 810 for requesting transmission of a unicast frame. For example, the AP may receive the PS-poll frame 810 to be transmitted by the multicast receiving STA through the primary channel, and may transmit a unicast frame 820 to the multicast receiving STA.

A multicast receiving STA which is not indicated by the TIM 800 and of which uplink data to be transmitted to the AP is not pended may maintain the dedicated multicast channel as the operating channel, and may receive a multicast frame from the AP on the multicast frame transmission time resource after the multicast receiving STA time resource period.

Referring to FIG. 8, the AP may report to the multicast receiving STA the pended data on the basis of the TIM 800 transmitted through the dedicated multicast channel. The multicast receiving STA may transmit the PS-poll frame 810 to the AP through the primary channel during the multicast receiving STA time resource period, and thereafter may receive the downlink frame 820 from the AP.

Upon completion of the reception of the downlink frame 820 from the AP, the multicast receiving STA may transition to a sleep mode for power saving until the multicast frame is transmitted through a next multicast frame transmission time resource. Upon completion of the reception of the downlink frame 820 from the AP on the basis of the TIM 800, the multicast receiving STA may maintain or transition to the sleep mode on the next multicast receiving STA time resource.

Figure 9:
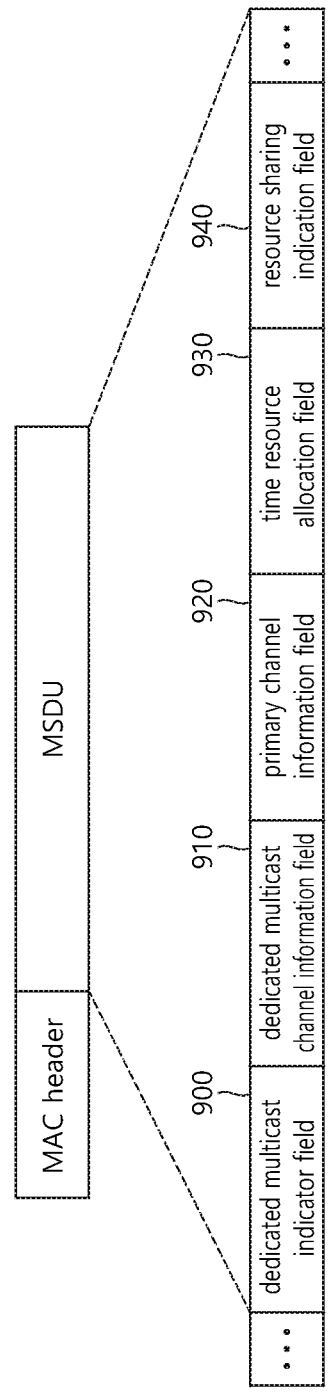
FIG. 9 is a concept view illustrating a beacon frame according to an embodiment of the present invention.

FIG. 9 is a concept view illustrating a beacon frame according to an embodiment of the present invention.

Referring to FIG. 9, the beacon frame may include at least one of a dedicated multicast indicator field 900, a dedicated multicast channel information field 910, a primary channel information field 920, a time resource allocation field 930, and a resource sharing indication field 940.

As described above, information included in at least one of the dedicated multicast indicator field 900, the dedicated multicast channel information field 910, the primary channel information field 920, the time resource allocation field 930, and the resource sharing indication field 940 may be transmitted through various frames other than the beacon frame.

The dedicated multicast indicator field 900 may indicate whether to support a dedicated multicast. For example, if a value of the dedicated multicast indicator field 900 is 0, it may indicate that a multicast based on an additional dedicated multicast channel is not supported, and if the value of the dedicated multicast indicator field 900 is 1, it may indicate that the multicast based on the additional dedicated multicast channel is supported. The dedicated multicast indicator field 900 may not be additionally included in the beacon frame, and may indicate whether to use the dedicated multicast channel on the basis of the dedicated multicast indicator field 900 to be described below.

The dedicated multicast channel information field 910 may include information on a channel configured as the dedicated multicast channel. For example, the dedicated multicast channel information field 910 may include a channel index for indicating the dedicated multicast channel and information on a channel bandwidth of the dedicated multicast channel.

The primary channel information field 920 may include information on a channel configured as a primary channel. For example, the primary channel information field 920 may include a channel index for indicating the primary channel and information on the bandwidth of the primary channel.

Further, the beacon frame may include the time resource allocation field 930. The time resource allocation field 930 may include information for determining information on a multicast frame transmission time resource, information on a multicast non-receiving STA time resource, and information on a multicast receiving STA time resource. In a method of FIG. 9, the beacon frame includes the information on the multicast frame transmission time resource, and the multicast non-receiving STA time resource and the multicast receiving STA time resource are determined on the basis of the multicast frame transmission time resource.

For example, the beacon frame may include the information on the multicast frame transmission time resource. The STA may determine the multicast non-receiving STA time resource and the multicast receiving STA time resource on the basis of the information on the multicast frame transmission time resource. The multicast non-receiving STA time resource may be determined as a time resource corresponding to the multicast frame transmission time resource, and the multicast receiving STA time resource may be the remaining time resources other than the multicast non-receiving STA time resource among all time resources.

Further, a TIM of the beacon frame to be transmitted through the dedicated multicast channel may include information for reporting to the multicast receiving STA an existence of pending data to be transmitted through a unicast frame by the AP.

Further, the beacon frame may include the resource sharing indication field 940 including information indicating whether the multicast receiving STA time resource is shared by the multicast non-receiving STA. If the resource sharing indication field 940 is 0, it may be allowed to use the multicast receiving STA time resource of the multicast non-receiving STA. On the contrary, if the resource sharing indication field 940 is 1, it may be restricted to use the multicast receiving STA time resource of the multicast non-receiving STA.

Figure 10:
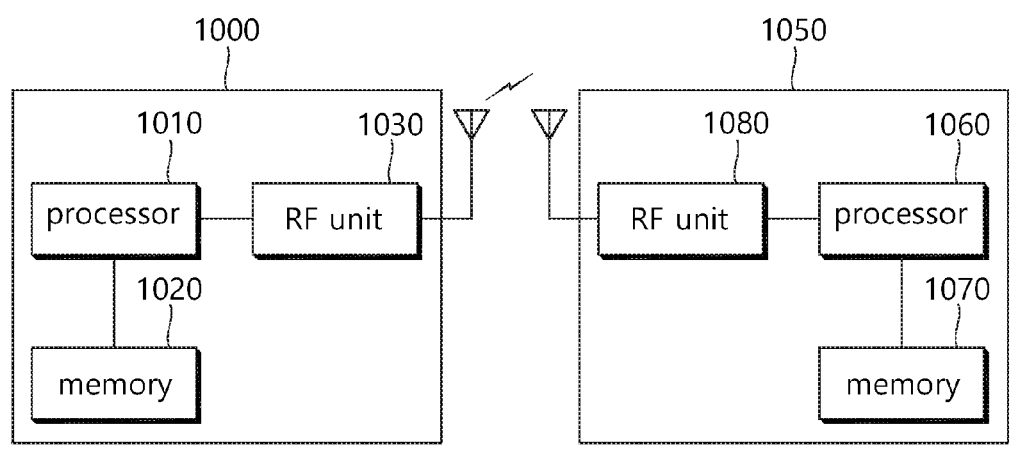
FIG. 10 is a block diagram illustrating a wireless device according to an embodiment of the present invention.

FIG. 10 is a block diagram illustrating a wireless device according to an embodiment of the present invention.

Referring to FIG. 10, a wireless device 1000 is an STA capable of implementing the aforementioned embodiment, and may be an AP 1000 or a non-AP STA (or STA) 1050.

The AP 1000 includes a processor 1010, a memory 1020, and a radio frequency (RF) unit 1030.

The RF unit 1030 may be coupled to the processor 1010 to transmit/receive a radio signal.

The processor 1010 may implement the functions, procedures, and/or methods proposed in the present invention. For example, the processor 1010 may be implemented to perform an operation of the wireless device according to the aforementioned embodiment of the present invention. The processor may perform the operation of the wireless device disclosed in the embodiment of FIG. 5 to FIG. 9.

For example, the processor 1010 may be implemented to separately configure a primary channel and a dedicated multicast channel to communicate with the STA and to transmit a multicast frame through a dedicated multicast channel. Further, the processor 1010 may configure a time resource for transmitting a unicast frame to the STA through the primary channel and a time resource for transmitting the multicast frame through the dedicated multicast channel.

An initial access frame generated by the processor 1010 to associate with the STA may include a first time resource, information on the primary channel, information on whether to use the dedicated multicast channel, and information on a second time resource.

Alternatively, the processor 1010 may receive a non-target RTS frame from another STA. In this case, if the processor 1010 fails to receive a non-target CTS frame after a specific time elapses but receives an RTS frame from the STA, the CTS frame may be transmitted in response to the RTS frame and a data frame may be received from the STA. A first duration value included in the CTS frame for determining a transmission duration of the data frame may be determined on the basis of a second duration value included in the non-target RTS frame.

An STA 1050 includes a processor 1060, a memory 1070, and an RF unit 1080.

The RF unit 1080 may be coupled to the processor 1060 to transmit/receive a radio signal.

The processor 1060 may implement the functions, procedures, and/or methods proposed in the present invention. For example, the processor 1020 may be implemented to perform an operation of the wireless device according to the aforementioned embodiment of the present invention. The processor may perform the operation of the STA disclosed in the embodiment of FIG. 5 to FIG. 9.

For example, the processor 1060 may be implemented to be associated with an AP on the basis of an initial access frame transmitted by the AP through a primary channel, and to configure an operating channel as a dedicated multicast channel on a first time resource. The initial access frame may include information on the first time resource and the primary channel. Further, the processor 1060 may be implemented to receive a multicast frame from the AP through the dedicated multicast channel on the first time resource, to configure an operating channel as a primary channel on a second time resource, and to receive a unicast frame from the AP through the primary channel on the second time resource.

The dedicated multicast channel is a channel only for a multicast of the AP. The primary channel is a channel for transmission other than the multicast of the AP. The first time resource and the second time resource may not overlap with each other.

The processors 1010 and 1060 may include application-specific integrated circuits (ASICs), other chipsets, logical circuits, data processing devices, and/or converters for mutually converting a baseband signal and a radio signal. The memories 1020 and 1070 may include a read-only memory (ROM), a random access memory (RAM), a flash memory, a memory card, a storage medium and/or other storage devices. The RF units 1030 and 1080 may include at least one antenna to transmit and/or receive the radio signal.

When the embodiment is implemented by software, the above scheme may be implemented by a module (procedure, function, and the like) to perform the above function. The module is stored in the memories 1020 and 1070 and may be implemented by the processors 1010 and 1060. The memories 1020 and 1070 may be installed inside or outside the processors 1010 and 1060, and may be coupled to the processors 1010 and 1060 through various known means.

What is claimed is:

1. A method for receiving a multicast frame in a wireless local area network (WLAN), the method comprising:

receiving, by a first station (STA), a beacon frame from an access point (AP) via a preset primary channel among a plurality of wireless channels, wherein the beacon frame includes channel information related to a dedicated multicast channel and scheduling information related to a first time resource and a second time resource, and wherein the dedicated multicast channel is dedicated to receive only multicast frames transmitted by the AP;

switching, by the first STA, an operating channel from the preset primary channel to the dedicated multicast channel on the first time resource based on the channel information and the scheduling information;

receiving, by the first STA, the multicast frame from the AP via the dedicated multicast channel on the first time resource;

switching, by the first STA, the operating channel from the dedicated multicast channel to the preset primary channel on the second time resource based on the channel information and the scheduling information; and communicating, by the first STA, a first unicast frame with the AP via the preset primary channel on the second time resource, wherein the first time resource and the second time source do not overlap, wherein the beacon frame further includes information on whether the second time resource is allowed for a second STA not receiving the multicast frame, wherein the second STA is served by the AP via the preset primary channel only on the first time resource if the second time resource is not allowed for the second STA, wherein a second unicast frame is received by the second STA via the preset primary channel on the first time resource, and wherein the channel information is used by the first STA and the second STA to prevent channel access to the dedicated multicast channel on the first time resource and the second time resource.

2. The method of claim 1, wherein:

the first STA, the second STA and the AP operate on the plurality of wireless channels and each of the preset primary channel and the dedicated multicast channel is one of the plurality of wireless channels.

3. A station (STA) for receiving a multicast frame in a wireless local area network (WLAN), the STA comprising:

a radio frequency (RF) unit configured to transmit or receive a radio signal; and a processor operatively coupled to the RF unit, the processor configured to:

control the RF unit to receive a beacon frame from an access point (AP) via a preset primary channel among a plurality of wireless channels, wherein the beacon frame includes channel information related to a dedicated multicast channel and scheduling information related to a first time resource and a second time resource, and wherein the dedicated multicast channel is dedicated to receive only multicast frames transmitted by the AP;

switch an operating channel from the preset primary channel to the dedicated multicast channel on the first time resource based on the channel information and the scheduling information;

control the RF unit to receive the multicast frame from the AP via the dedicated multicast channel on the first time resource;

switch the operating channel from the dedicated multicast channel to the preset primary channel on the second time resource based on the channel information and the scheduling information; and control the RF unit to communicate a first unicast frame with the AP via the preset primary channel on the second time resource, wherein the first time resource and the second time source do not overlap, wherein the beacon frame further includes information on whether the second time resource is allowed for a second STA not receiving the multicast frame, wherein the second STA is served by the AP via the preset primary channel only on the first time resource if the second time resource is not allowed for the second STA, wherein a second unicast frame is received by the second STA via the preset primary channel on the first time resource, and wherein the channel information is used by the first STA and second STA to prevent channel access to the dedicated multicast channel on the first time resource and the second time resource.

4. The STA of claim 3, wherein:

the first STA, the second STA and the AP operate on the plurality of wireless channels; and each of the primary channel and the dedicated multicast channel is one of the plurality of wireless channels.

* * * * *